United States Patent [19]

Palarino

[11] 4,020,874
[45] May 3, 1977

[54] THERMOPLASTIC THREAD PROTECTOR FOR INTERNALLY THREADED PIPE

[75] Inventor: Ronald H. Palarino, North Huntington, Pa.

[73] Assignee: Precise Metals & Plastic, Inc., East McKeesport, Pa.

[22] Filed: Sept. 5, 1975

[21] Appl. No.: 610,646

[52] U.S. Cl. ............................................. 138/96 T
[51] Int. Cl.² ................... B65D 59/00; B65D 59/04
[58] Field of Search ............... 138/109, 96 R, 96 T; 220/233; 215/358; 217/78, 79, 108

[56] References Cited

UNITED STATES PATENTS

| | | | |
|---|---|---|---|
| 2,022,189 | 11/1935 | Engstrom | 138/96 T |
| 2,121,436 | 6/1938 | Lytle | 138/96 T |
| 2,893,437 | 7/1959 | Rickard | 138/96 T |
| 3,056,427 | 10/1962 | Higgins | 138/96 T |
| 3,073,470 | 1/1963 | Greene | 215/358 X |
| 3,578,200 | 5/1971 | Hetzer | 138/96 T X |
| 3,964,339 | 6/1976 | Antonio et al. | 74/551.9 |

FOREIGN PATENTS OR APPLICATIONS

| | | | |
|---|---|---|---|
| 656,059 | 11/1964 | France | 215/358 |
| 628,538 | 11/1961 | Italy | 215/358 |

*Primary Examiner*—Richard E. Aegerter
*Assistant Examiner*—James E. Bryant, III
*Attorney, Agent, or Firm*—Parmelee, Miller, Welsh & Kratz

[57] ABSTRACT

A thermoplastic thread protector is provided for use in protecting internal threads of a pipe or coupling, the protector comprising a tapered shell having threads thereon and an outer flange which rest on the end of the pipe, and a tapered expansion ring designed to expand the shell into locking contact with the pipe, the shell and ring being interlocked through a rim around one end of the ring and a lip around the other end so that the protector must be unscrewed as a unit from the pipe.

6 Claims, 5 Drawing Figures

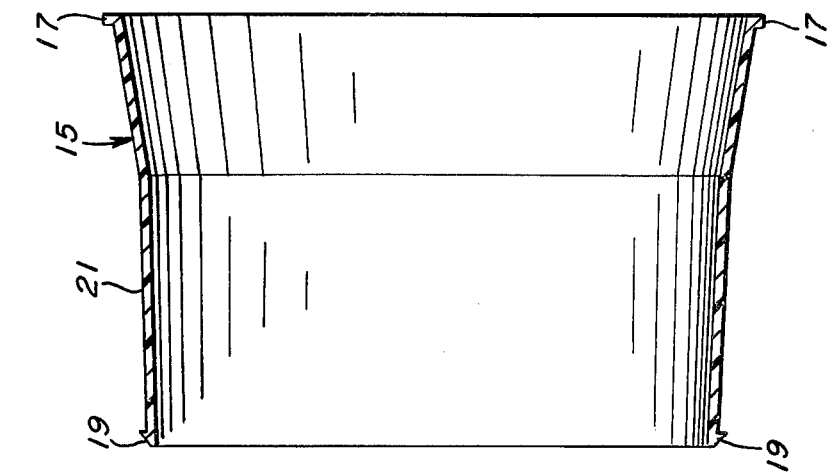
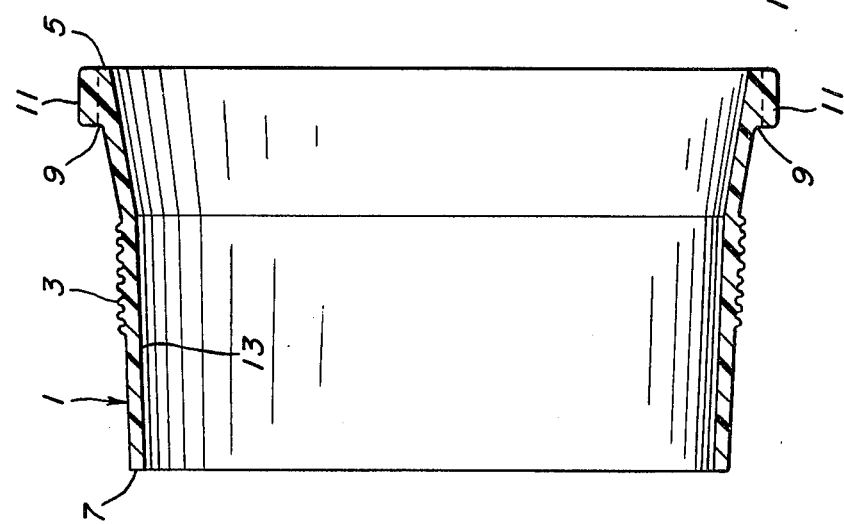
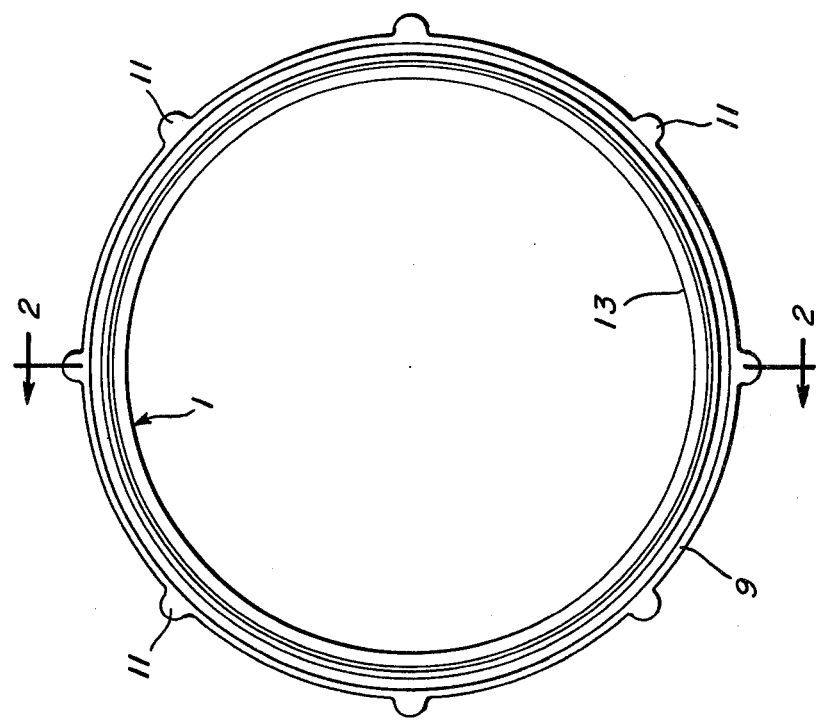

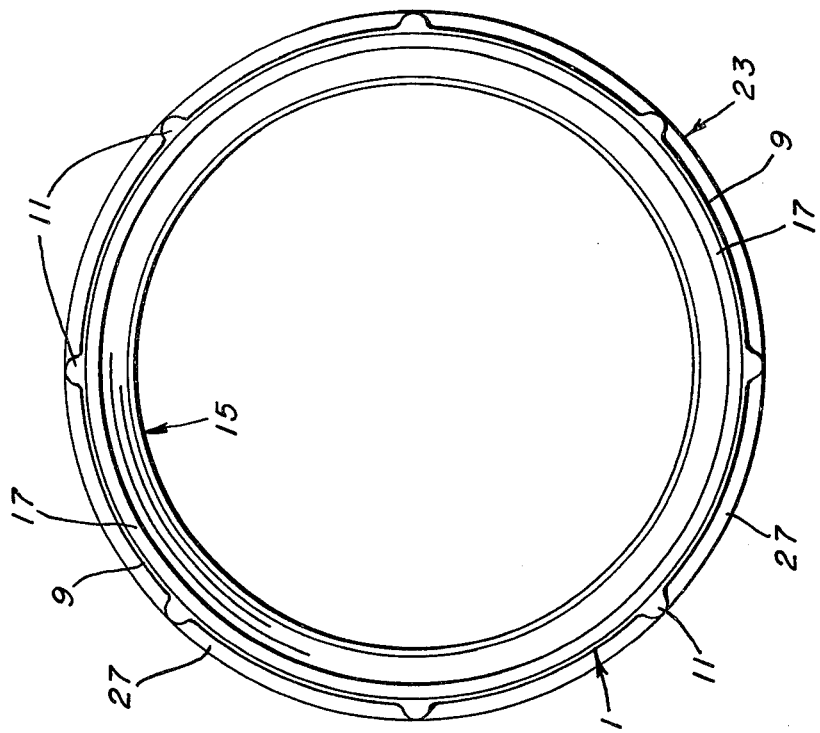
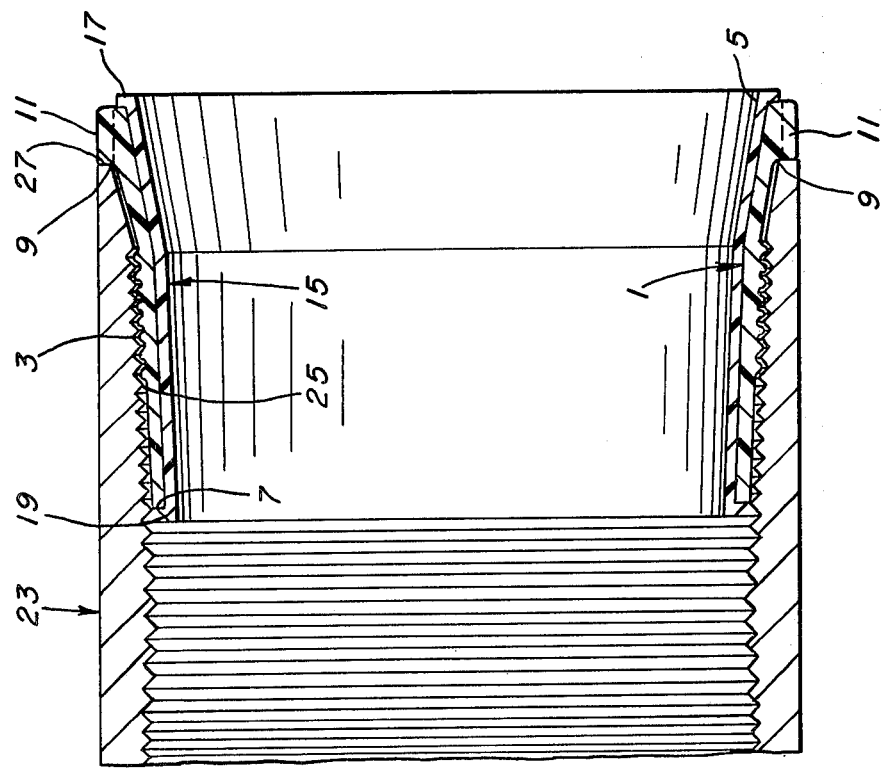

THERMOPLASTIC THREAD PROTECTOR FOR INTERNALLY THREADED PIPE

BACKGROUND OF THE INVENTION

The threads of pipe, such as pipe used in transfer of gas or oil, are, during loading, transport, unloading and storage prior to use, often subjected to impacts and collection of dirt, water and the like which adversely affect the threads. Often, when the threads are damaged, the complete pipe section must be replaced. While the external threads of a pipe are more susceptible to such adverse effects, the internally threaded end of a pipe is also subject to damage. For example, in transferring pipe, cranes are used which use hooks inserted into the pipe, which hooks can damage the thread. Of course, the collection of dust, water and other undesirable materials within the internal threads is always a problem in storage, so that the complete and constant protection of the threads is greatly desired. Couplings for externally threaded pipe are also faced with these problems where the internal threads of the couplings are subject to damage or defacing.

Brief Summary of the Invention

A thermoplastic thread protector for internally threaded pipes comprises a tapered cylindrically shaped threaded shell engageable with the threads of the pipe and a tapered cylindrically shaped expansion ring. The shell carries a flange at one end which rests upon the terminus of the pipe when inserted for use, the flange having outwardly and axially depending projections which strengthen the flange and also provide means for removal of the assembled thread protector from the pipe. An expansion ring is provided, the ring expanding the sleeve into locking contact with the pipe, with an outwardly extending rim around the wide end thereof which rests upon the flange of the shell and a lip at the other end, the combination of which locks the ring to the shell and the thread protector as a unit to the threaded pipe, requiring unscrewing of the protector from the pipe for removal and providing a secure locking of the same to the pipe.

BRIEF DESCRIPTION OF THE DRAWINGS

FIG. 1 is an end view of the cylindrically shaped shell forming a part of the internal thread protector of the present invention;

FIG. 2 is a view taken along the lines 2—2 of FIG. 1;

FIG. 3 is a cross-sectional view of the expansion ring forming a part of the internal thread protector of the present invention;

FIG. 4 is a cross-sectional view of the internal thread protector of the present invention secured in one threaded end of a coupling; and FIG. 5 is an end view illustrating the internal thread protector of the present invention assembled and secured as a unit in a pipe or coupling.

DETAILED DESCRIPTION

The internal thread protector of the present invention is formed from a thermoplastic material which provides impact resistance. Suitable thermoplastics include polyethylene, polypropylene, polyvinyl chloride, polycarbonate and the like, as well as copolymers thereof. Polyethylene and copolymers of polyethylene are preferred because of the excellent impact properties thereof.

Referring now to the drawings, and specifically to FIGS. 1 and 2, there is described the axially tapered cylindrically shaped shell 1 of the thread protector. The shell 1, which is preferably injection molded from polyethylene, has threads 3 on the outer surface, which threads are complementary with threads on the internal surface of a pipe. While the present description refers to internally threaded pipe, it is to be understood that use of the protector on an internally threaded coupling is also intended to be included. The shell is tapered from a wide end 5, to a more narrow end 7, such that the narrow end is easily insertable into the pipe to be protected. The length of the shell 1 should be sufficient to cover the threaded portion of the pipe, that is to accept a mating threaded pipe, although the threads 3 on the shell may extend only along a portion of the shell, as illustrated. When used on a coupling, of course, the shell would terminate just short of the midpoint thereof. The shell 1 terminates at its wide end 5 as a flange 9, which flange 9 extends outwardly from the axis of the shell and is so constructed as to rest upon the terminus of a pipe when the thread protector is assembled therein. The flange 9 has thereon outwardly and axially extending projections 11, preferably spaced equidistantly about the flange. The inner wall 13 of the shell is smooth so as to readily enable axial insertion of an expansion ring 15 therein.

In FIG. 3, the expansion ring 15 is shown, the ring 15 comprising a tapered, cylindrically shaped ring having an outwardly extending rim 17 about the wide end thereof and an outwardly directed lip 19 around the other end. The outer wall 21 of the expansion ring 15 is smooth so as to permit easy axial insertion thereof into the shell 1.

The assembly of the thread protector in a coupling 23 for the purpose of protecting the internal threads 25 thereof is shown in FIGS. 4 and 5, the end or terminus of the coupling identified at 27. In assembly of the thread protector, the shell 1 is axially inserted into the end of the coupling 23, with the flange 9 of shell 1 resting upon the terminus 27 of the coupling. The shell, because of its tapered cylindrical shape, is easily inserted and no particular alignment thereof with the end of the coupling is needed. With the flange 9 resting on the coupling end 27, the projections 11 are positioned radially about the flange and also rest upon the coupling end 27, as shown in FIG. 5, to give support to the shell. With the shell 1 so arranged, the expansion ring 15 is axially inserted therein, the ring 15 causing expansion of the shell such that the threads 3 on the outer surface thereof are mated with the threads 25 on the internal wall of coupling 23 to lock the same thereto. The expansion ring 15 is of a length such that, upon insertion into the shell 1, the outwardly directed lip 19 will contact the end 7 of the shell, although not touching the coupling wall itself. The rim 17 of the ring rests on the flange 9 of the shell, thus locking the ring 15 to the shell 1. With the shell 1 and ring 15 so locked and the threads 3 mated with threads 25 of the coupling, the removal of the thread protector from the coupling is effected only by unscrewing the protector as a unit therefrom. Such unscrewing can be effected by the use of a wrench or the like about the projections 11 on the shell.

As best seen in FIG. 5, the flange 9 and projections 11 of the shell 1 rest upon the terminus 27 of the coupling 23, with the rim 17 of the expansion ring 15 in secure contact with the flange. Such arragement provides strengthening for the shell and secure locking of the shell between the lip 19 and rim 17 of the expansion ring 15. The thread protector, once assembled in a pipe or coupling, may be removed by unscrewing as a unit for inspection of the threads and replaced as a unit by screwing the same back into locked position as a unit, while protecting the threads from impact and foreign substances when in place thereon.

I claim:

1. A thermoplastic thread protector for the inner threads of a pipe or coupling, comprising:
    a frusto-conically shaped shell having threads on the outer wall thereof, the length of the shell sufficient to cover the threaded portion of the pipe, said shell terminating at the wide end thereof as a flange extending away from the longitudinal axis of the shell, the flange having spaced outwardly and axially extending projections; and
    a frusto-conically shaped expansion ring having an outwardly extending rim around the wide end thereof and an outwardly directed lip around the other end, the ring being of such a dimension that when inserted into the shell, with the shell placed in the pipe and the flange thereof resting on the end of the pipe, the shell is expanded to lock the threads thereof with the pipe threads and concentrically mate the ring and shell, with the ends of the shell contiguous with and locked between the rim and lip of said ring.

2. The thermoplastic thread protector defined in claim 1 wherein the outwardly extending rim on the expansion ring covers the flange of the shell with said projections extending radially outwardly therefrom.

3. The thermoplastic thread protector defined in claim 1 wherein the threds on the shell extend only along a portion thereof.

4. The thermoplastic thread protector defined in claim 3 wherein said portion is spaced from the wide end of the shell.

5. The thermoplastic thread protector defined in claim 4 wherein the taper of the shell is more severe between the threads and the wide end of the shell than between the threads and the opposite end of the shell.

6. The thermoplastic thread protector defined in claim 5 wherein the taper of said expansion ring corresponds to the taper of said shell.

* * * * *